(12) United States Patent
Chen et al.

(10) Patent No.: US 7,738,186 B2
(45) Date of Patent: Jun. 15, 2010

(54) OPTICAL LENS SYSTEM FOR TAKING IMAGE

(75) Inventors: Chun Shan Chen, Taichung (TW); Hsiang Chi Tang, Taichung (TW)

(73) Assignee: Largan Precision Co., Ltd., Taichung (TW)

(*) Notice: Subject to any disclaimer, the term of this patent is extended or adjusted under 35 U.S.C. 154(b) by 351 days.

(21) Appl. No.: 12/030,202

(22) Filed: Feb. 12, 2008

(65) Prior Publication Data
US 2009/0128927 A1    May 21, 2009

(30) Foreign Application Priority Data
Nov. 16, 2007    (TW) .............................. 96143599 A

(51) Int. Cl.
*G02B 13/08* (2006.01)
*G02B 9/34* (2006.01)

(52) U.S. Cl. ...................................... 359/715; 359/772

(58) Field of Classification Search ......... 359/713–715, 359/772
See application file for complete search history.

(56) References Cited

U.S. PATENT DOCUMENTS
2006/0238898 A1* 10/2006 Shinohara ................... 359/771

* cited by examiner

*Primary Examiner*—Scott J Sugarman
(74) *Attorney, Agent, or Firm*—Banger Shia

(57) ABSTRACT

An optical lens system for taking image comprises, in order from the object side to the image side: a first lens element with positive refractive power having a convex object-side surface; a second lens element with negative refractive power having a concave image-side surface and at least one aspheric surface; a meniscus third lens element with negative refractive power having a convex image-side surface; and a fourth lens element with negative refractive power having a convex object-side surface and an aspheric image-side surface. The above configurations and arrangements of the lens elements can effectively reduce the size of the optical system while improving its resolution.

22 Claims, 6 Drawing Sheets

OPTICAL LENS SYSTEM FOR TAKING IMAGE

BACKGROUND OF THE INVENTION

1. Field of the Invention

The present invention relates to an optical lens system for taking image, and more particularly to a four-lens type optical lens system for taking image used in a mobile phone camera.

2. Description of the Prior Art

In recent years, with the popularity of mobile phone camera, the optical lens system for taking image has been becoming thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution. Therefore, there's increasing demand for image quality.

A conventional high resolution mobile phone camera usually takes the form of "front aperture stop", and this kind of mobile phone camera generally requires four lens elements for high resolution: the first and second lens elements are usually two glass lens elements with a spherical surface that are glued to each other to form a Doublet for eliminating chromatic aberration. However, this method has the following disadvantages:

First, the arrangement of too many spherical lens elements reduces the degree of freedom of the optical system, and as a result, reducing the length of the whole optical system is difficult.

Second, the gluing process of the glass lens elements is difficult to control.

The present invention mitigates and/or obviates the aforementioned disadvantages.

SUMMARY OF THE INVENTION

To improve the image quality of the optical system and effectively reduce the size of the optical lens system, the present invention provides a whole new four-lens type optical lens system and the characteristics of which are explained as follows:

An optical lens system for taking image comprises, in order from the object side to the image side: a first lens element with positive refractive power having a convex object-side surface; a second lens element with negative refractive power having a concave image-side surface; a meniscus third lens element with negative refractive power having a convex image-side surface; and a fourth lens element with negative refractive power having a convex object-side surface and an aspheric image-side surface. With the above configurations and arrangements of the lens elements, the resolution of the optical system can be improved effectively.

The first lens element provides strong positive refractive power, and the aperture stop is located close to the object side, so that the exit pupil of the optical lens system will be far away from the image plane. Therefore, the light will be projected onto the sensor with a relatively small incident angle, this is the telecentric feature of the image side, and this feature is very important to the photosensitive power of the current solid-state sensor, and can improve the photosensitivity of the sensor while reducing the probability of the occurrence of shading.

To effectively correct the chromatic aberration of the system, the optical lens system for taking image in accordance with the present invention has first, second and fourth lens elements with Abbe numbers $V1$, $V2$ and $V4$ respectively which satisfy the following relations:

$$V2<32;$$

$$[(V1+V4)/2]-V2>15;$$

$$V4>45.$$

And if the Abbe Number $V2$ of the second lens element is controlled to satisfy the relation: $V2<29$, the image quality of the system in accordance with the present invention can be further improved.

With the miniaturization of the optical lens system and the requirement of a large field of view, the focal length of the optical lens system is becoming very short. Therefore, the absolute value of the radius of curvature and the size of the lens elements must be very small, and it is impossible to make such lens elements from glass using conventional grinding methods. Plastic material is introduced to make lens elements by injection molding, using a relatively low cost to produce high precision lens elements. The surfaces of lens element are aspheric, allowing more design parameters (than spherical surfaces), so as to better reduce the aberration and the number of the lens elements. And inflection points are formed on the surfaces of the lens elements, which is more effective in correcting off axis aberration.

In the present optical lens system for taking image, the focal length of the first lens element is f1, the focal length of the second lens element is f2, the focal length of the third lens element is f3, the focal length of the fourth lens element is f4, the focal length of the first and second lens elements combined is f12, the focal length of the optical lens system for taking image is f, and they satisfy the relations:

$$1.2<f/f1<2.0;$$

$$-0.5<f/f3<0;$$

$$-0.5<f/f4<0;$$

If the value of f/f1 is smaller than the above lower limit, it will result in a weak refractive power and an excessively long total track length of the system, and it will be difficult to suppress the incident angle of the light with respect to the sensor as well. And if the value of f/f1 is greater than the above upper limit, the high order aberrations caused by the system will be difficult to correct. The third and fourth lens elements act as correcting lenses, and it will be ideal if the values of their refractive powers are within the above range.

Further, it will be better if the values of f/f1, f/f2, f/f3, f/f4 and f/f12 satisfy the following relations:

$$1.4<f/f1<1.7;$$

$$-0.8<f/f2<-0.5;$$

$$-0.2<f/f3<0;$$

$$-0.5<f/f4<0;$$

$$0.8<f/f12<1.2.$$

The ranges defined by the above relations enable the optical system of the present invention to maintain a balance between total optical track length and the image quality.

In the present optical lens system for taking image, the tangential angle of the image-side surface of the fourth lens element at the position of its effective optical diameter is ANG42, and it satisfies the relation: ANG42<−28 deg.

The above relation can effectively reduce the incident angle of the light with respect to the sensor while improving the correction of the off axis aberration.

The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and these two planes Plane Tan and Plane Norm, respectively. This tangential angle is less than 90 degree in absolute value. The sign of the tangential angle is taken to be negative if N is closer than T to the object side of the optical lens system, and positive otherwise.

In the present optical lens system for taking image, the radius of curvature of the object-side surface of the first lens element is R1, the radius of curvature of the image-side surface of the second lens element is R4, the focal length of the optical lens system for taking image is f, and they satisfy the relation:

$$0.2 < R1/f < 0.6;$$

$$0.5 < R4/f < 1.2;$$

The above relations enable the optical system of the present invention to maintain a balance between total optical track length and the image quality.

An object to be photographed by the optical lens system for taking image in accordance with the present invention is imaged on an electronic imaging sensor, a total track length of the system is TTL, a maximum image height of the system is ImgH, and they satisfy the relation: TTL/ImgH<2.2. This relation enables the system to maintain the feature of miniaturization.

In the present optical lens system for taking image, an on-axis distance between the first lens element and the second lens element is T12, a focal length of the optical lens system for taking image is f, and they satisfy the relation: T12/f>0.015.

The above relation can effectively improve the ability of the optical system to correct Astigmatism.

In the present optical lens system for taking image, a center thickness of the second lens element is CT2, and it satisfies the relation: 0.25 mm<CT2<0.7 mm. This relation can effectively correct the aberration caused by the optical system while reducing the total track length thereof.

In the present optical lens system for taking image, an incident angle of chief rays corresponding to the maximum image height onto the electronic sensor is CRA (Chief Ray Angle), and half of the maximal field of view is HFOV, and they satisfy the relation: 0.5<tan (CRA)/tan (HFOV)<1.05.

The above relation can make the optical lens system for taking image compatible with electronic sensor while providing a large field of view.

DETAILED DESCRIPTION OF THE PREFERRED EMBODIMENTS

Figure 1:
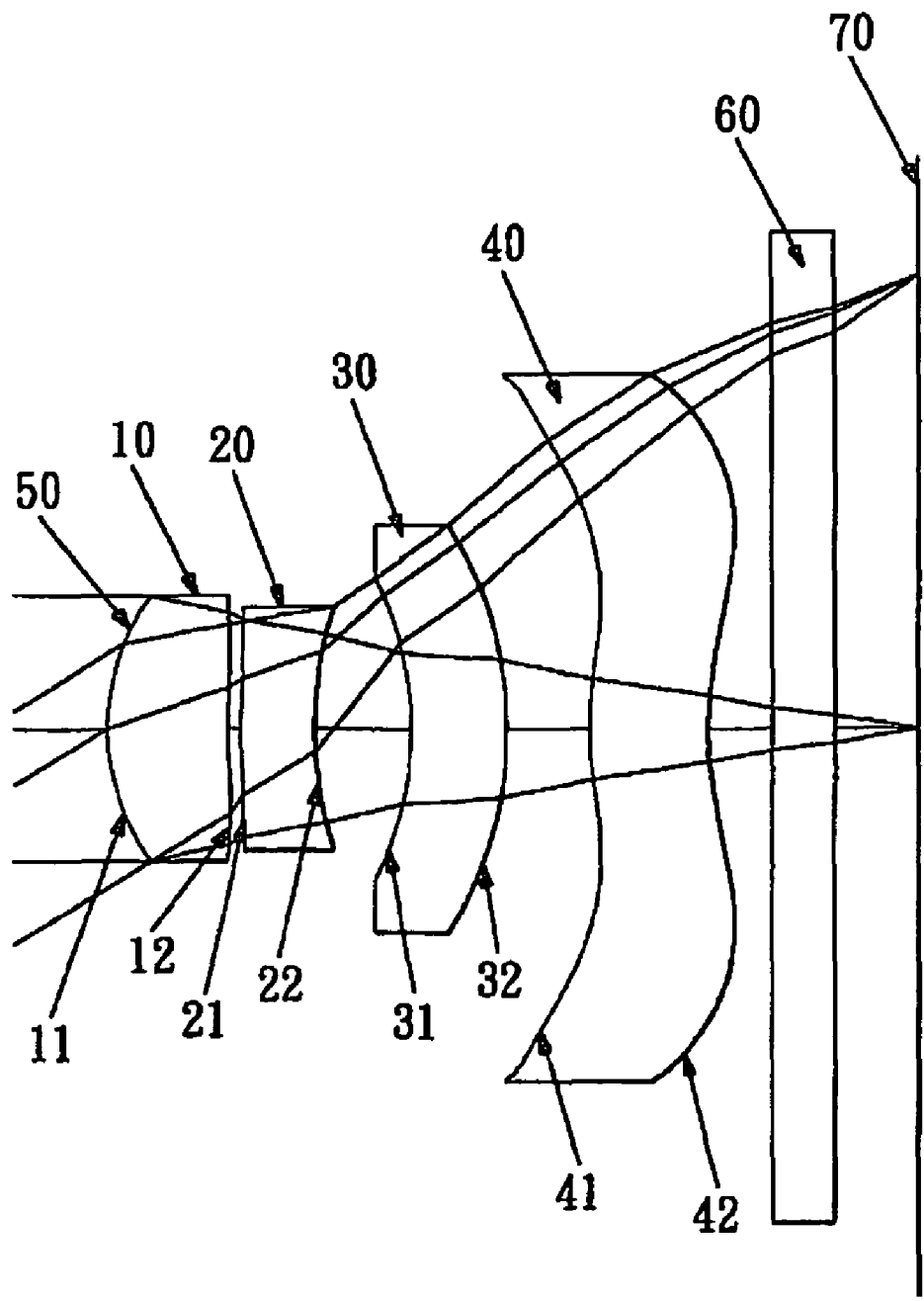
FIG. 1 shows an optical lens system for taking image in accordance with a first embodiment of the present invention.
Figure 2:
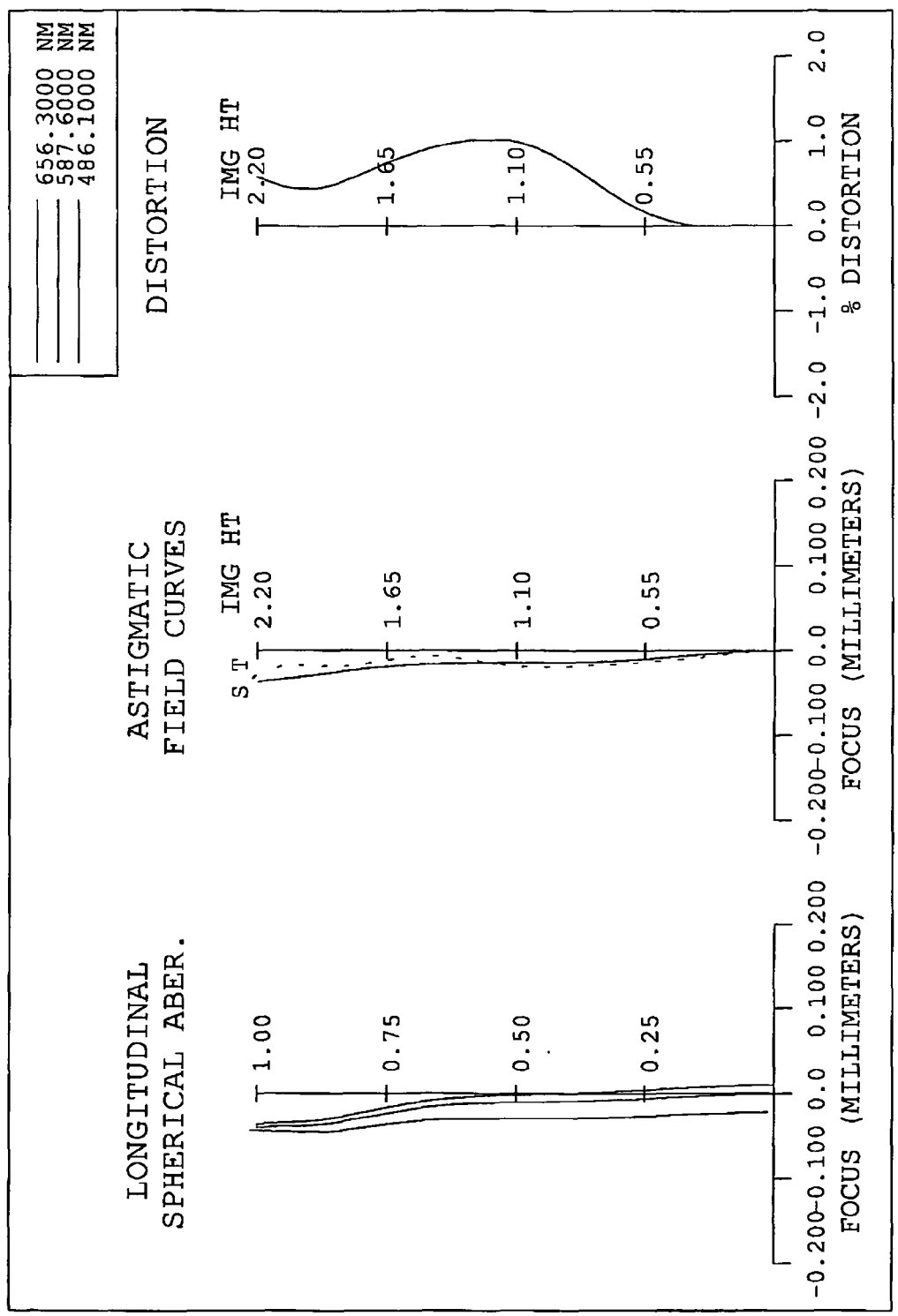
FIG. 2 shows the aberration curve of the first embodiment of the present invention.

Referring to FIG. 1, which shows an optical lens system for taking image in accordance with a first embodiment of the present invention, and FIG. 2 shows the aberration curve of the first embodiment of the present invention. An optical lens system for taking image in accordance with a first embodiment of the present invention comprises: in order from the object side to the image side:

A plastic first lens element 10 with positive refractive power has a convex object-side surface 11 and a concave image-side surface 12, and both the object-side surface 11 and the image-side surface 12 of the first lens element 10 are aspheric.

A plastic second lens element 20 with negative refractive power has a convex object-side surface 21 and a concave image-side surface 22, both the object-side surface 21 and the image-side surface 22 of the second lens element 20 are aspheric.

A plastic meniscus third lens element 30 with negative refractive power has a concave object-side surface 31 and a convex image-side surface 32, both the object-side surface 31 and the image-side surface 32 of the third lens element 30 are aspheric.

A plastic fourth lens element 40 with negative refractive power has a convex object-side surface 41 and a concave image-side surface 42, both the object-side surface 41 and the image-side surface 42 of the fourth lens element 40 are aspheric, and inflection points are formed on each of the object-side surface 41 and the image-side surface 42.

An aperture stop 50 is located in front of the first lens element 10.

An IR cut filter 60 is located behind the fourth lens element 40 and has no influence on the focal length of the optical lens system.

An image plane 70 is located behind the IR cut filter 60.

The equation of the curves of the aspheric surfaces is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric lens surface at a distance Y from the optical axis relative to the tangential plane of the aspheric surface vertex;

Y: the distance from the point on the curve of the aspheric surface to the optical axis;

k: the conic coefficient;

Ai: the aspheric surface coefficient of order i.

In the first embodiment of the present optical lens system for taking image, the focal length of the first lens element is f1, the focal length of the second lens element is f2, the focal length of the third lens element is f3, the focal length of the fourth lens element is f4, the focal length of the first and second lens elements combined is f12, the focal length of the optical lens system for taking image is f, and they satisfy the relations:

$$f=3.56 \text{ mm};$$

$$f/f1=1.50;$$

$$f/f2=-0.64;$$

$$f/f3=-0.003;$$

$$f/f4=-0.39;$$

$$f/f12=1.07.$$

In the first embodiment of the present optical lens system for taking image, the Abbe number of the first lens element is V1, the Abbe number of the second lens element is V2, the Abbe number of the fourth lens element is V4, and they satisfy the relations:

V2=23.4;

V4=55.8;

$[(V1+V4)/2]-V2=32.8$.

In the first embodiment of the present optical lens system for taking image, the radius of curvature of the object-side surface of the first lens element is R1, the focal length of the optical lens system for taking image is f, and they satisfy the relation: R1/f=0.32.

In the first embodiment of the present optical lens system for taking image, the radius of curvature of the image-side surface of the second lens element is R4, the focal length of the optical lens system for taking image is f, and they satisfy the relation: R4/f=0.69.

In the first embodiment of the present optical lens system for taking image, the center thickness of the second lens element is CT2, and it satisfies the relation: CT2=0.350 mm.

In the first embodiment of the present optical lens system for taking image, the tangential angle of the image-side surface of the fourth lens element at the position of its effective optical diameter is ANG42, and ANG42=−34.7 deg. The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and these two planes Plane Tan and Plane Norm, respectively. This tangential angle is less than 90 degree in absolute value. The sign of the tangential angle is taken to be negative if N is closer than T to the object side of the optical lens system, and positive otherwise.

In the first embodiment of the present optical lens system for taking image, the incident angle of the chief rays corresponding to the maximum image height onto the electronic sensor is CRA (Chief Ray Angle), and half of the maximal field of view is HFOV, and they satisfy the relation: tan (CRA)/tan (HFOV)=0.82.

In the first embodiment of the present optical lens system for taking image, an on-axis distance between the first lens element and the second lens element is T12, the focal length of the optical lens system for taking image is f, and they satisfy the relation: T12/f=0.020.

In the first embodiment of the present optical lens system for taking image, the total track length of the optical lens system is TTL, the maximum image height of the optical lens system is ImgH, and they satisfy the relation:

$TTL/ImgH=1.75$.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f (focal length) = 3.56 mm, Fno = 2.8, HFOV (half of field of view) = 31.6 deg.

| Surface # | | Curvature Radius | Thickness | Material | Index | Abbe # | Focal length |
|---|---|---|---|---|---|---|---|
| 0 | Object | Plano | Infinity | | | | |
| | Ape. Stop | | | | | | |
| 1 | Lens 1 | 1.14033(ASP) | 0.558 | Plastic | 1.543 | 56.5 | 2.39 |
| 2 | | 7.71830(ASP) | 0.070 | | | | |
| 3 | Lens 2 | 8.34880(ASP) | 0.350 | Plastic | 1.632 | 23.4 | −5.62 |
| 4 | | 2.45225(ASP) | 0.455 | | | | |
| 5 | Lens 3 | −2.51873(ASP) | 0.461 | Plastic | 1.543 | 56.5 | −1149.81 |
| 6 | | −2.69189(ASP) | 0.405 | | | | |
| 7 | Lens 4 | 2.06586(ASP) | 0.551 | Plastic | 1.530 | 55.8 | −9.29 |
| 8 | | 1.32092(ASP) | 0.300 | | | | |
| 9 | IR-filter | Plano | 0.300 | Glass | 1.517 | 64.1 | |
| 10 | | Plano | 0.390 | | | | |
| 11 | Image | Plano | | | | | — |

TABLE 2

Aspheric Coefficients

| | Surface # | | | |
|---|---|---|---|---|
| | 1 | 2 | 3 | 4 |
| k = | −1.33902E−01 | 0.00000E+00 | 0.00000E+00 | −5.65556E+00 |
| A4 = | 1.03808E−02 | −1.33987E−01 | −9.99676E−02 | 1.61215E−01 |
| A6 = | −9.42864E−02 | 6.32447E−02 | 7.11577E−02 | 8.19150E−03 |
| A8 = | 3.35935E−01 | −4.90780E−01 | −1.98975E−01 | 3.96247E−01 |
| A10 = | −5.66478E−01 | −1.25742E−02 | −2.88497E−01 | |

| | Surface # | | | |
|---|---|---|---|---|
| | 5 | 6 | 7 | 8 |
| k = | −1.00085E+00 | 1.17699E+00 | −1.25778E+01 | −7.28164E+00 |
| A4 = | −6.37151E−02 | −1.48073E−01 | −3.01290E−01 | −1.39463E−01 |
| A6 = | −4.01318E−01 | 6.03440E−02 | 1.17593E−01 | 3.36578E−02 |
| A8 = | 8.20985E−02 | −5.18037E−02 | −2.10841E−02 | −4.77753E−03 |

TABLE 2-continued

Aspheric Coefficients

| A10 = | 7.78895E−01 | 1.88415E−02 | 5.58830E−03 | −7.95611E−04 |
|---|---|---|---|---|
| A12 = | −1.34607E+00 | 4.61830E−02 | −7.86663E−04 | −1.37778E−04 |
| A14 = | 5.72115E−01 | 1.76367E−02 | −3.45665E−04 | 1.89334E−04 |
| A16 = | −4.48893E−01 | −3.80116E−02 | 6.28828E−05 | −2.99422E−05 |

Figure 3:
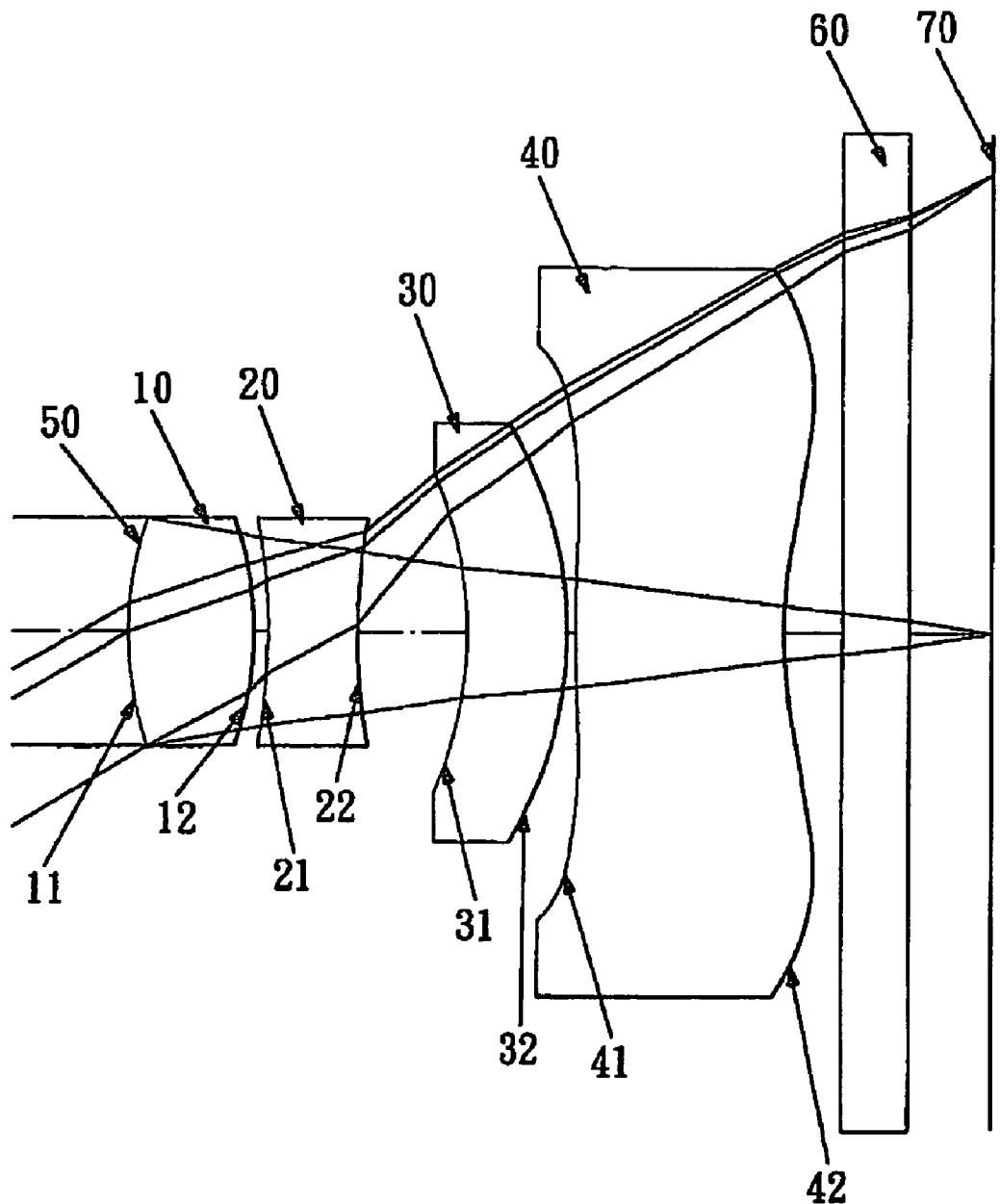
FIG. 3 shows an optical lens system for taking image in accordance with a second embodiment of the present invention.
Figure 4:
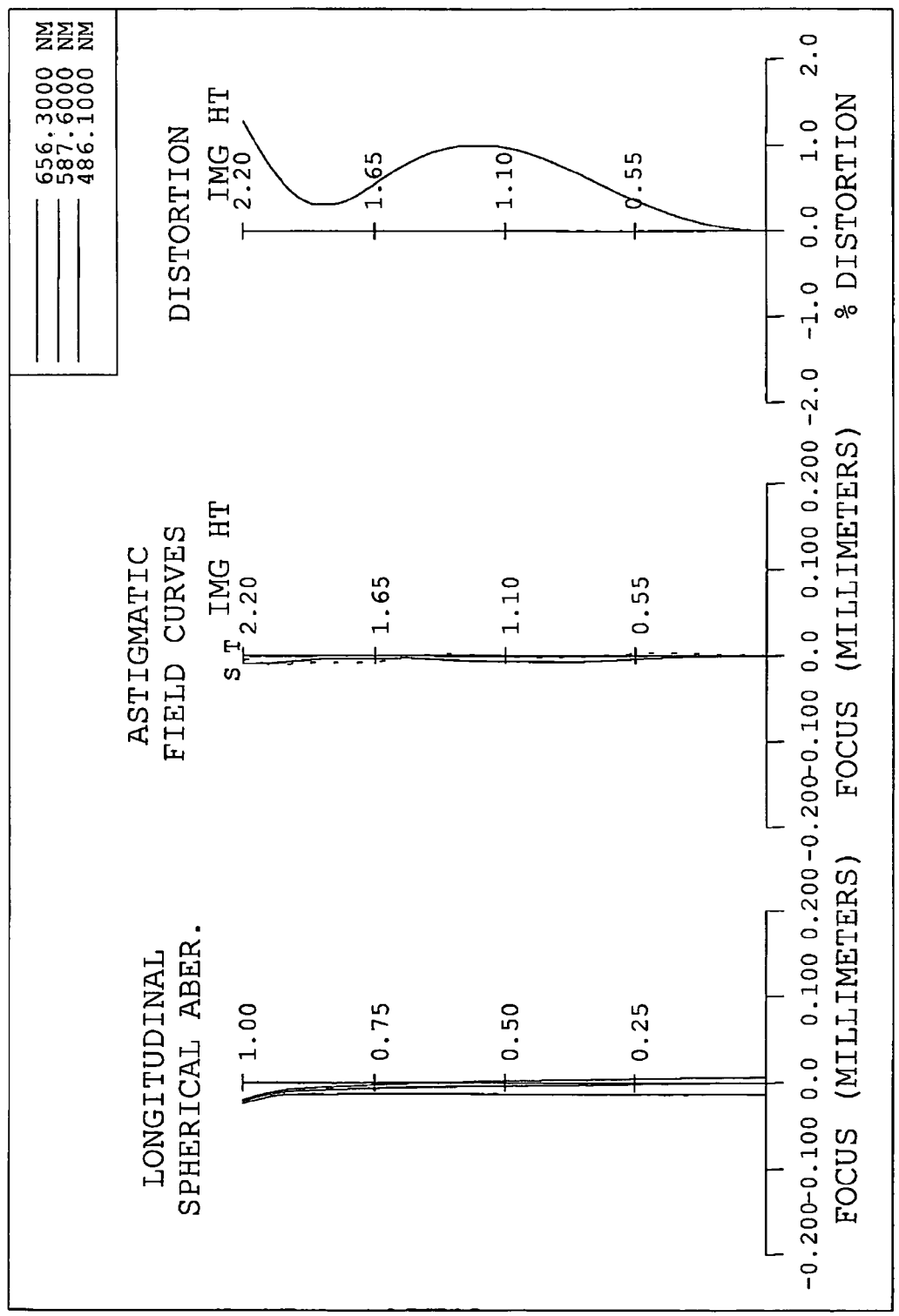
FIG. 4 shows the aberration curve of the second embodiment of the present invention.

Referring to FIG. 3, which shows an optical lens system for taking image in accordance with a second embodiment of the present invention, and FIG. 4 shows the aberration curve of the second embodiment of the present invention. An optical lens system for taking image in accordance with a second embodiment of the present invention comprises: from the object side to the image side:

A plastic first lens element 10 with positive refractive power has a convex object-side surface 11 and a convex image-side surface 12, and both the object-side surface 11 and the image-side surface 12 of the first lens element 10 are aspheric.

A plastic second lens element 20 with negative refractive power has a concave object-side surface 21 and a concave image-side surface 22, both the object-side surface 21 and the image-side surface 22 of the second lens element 20 are aspheric.

A plastic meniscus third lens element 30 with negative refractive power has a concave object-side surface 31 and a convex image-side surface 32, both the object-side surface 31 and the image-side surface 32 of the third lens element 30 are aspheric.

A plastic fourth lens element 40 with negative refractive power has a convex object-side surface 41 and a concave image-side surface 42, both the object-side surface 41 and the image-side surface 42 of the fourth lens element 40 are aspheric, and inflection points are formed on each of the object-side surface 41 and the image-side surface 42.

An aperture stop 50 is located in front of the first lens element 10.

An IR cut filter 60 is located behind the fourth lens element 40 and has no influence on the focal length of the optical lens system.

An image plane 70 is located behind the IR cut filter 60.

The equation for the aspheric surface profiles of the second embodiment has the same form as that of the first embodiment.

In the second embodiment of the present optical lens system for taking image, the focal length of the first lens element is f1, the focal length of the second lens element is f2, the focal length of the third lens element is f3, the focal length of the fourth lens element is f4, the focal length of the first and second lens elements combined is f12, the focal length of the optical lens system for taking image is f, and they satisfy the relations:

$f=3.48$ mm;

$f/f1=1.80$;

$f/f2=-1.12$;

$f/f3=-0.10$;

$f/f4=-0.10$;

$f/f12=0.98$.

In the second embodiment of the present optical lens system for taking image, the Abbe number of the first lens element is V1, the Abbe number of the second lens element is V2, the Abbe number of the fourth lens element is V4, and they satisfy the relations:

$V2=30.2$;

$V4=55.8$;

$[(V1+V4)/2]-V2=26.0$.

In the second embodiment of the present optical lens system for taking image, the radius of curvature of the object-side surface of the first lens element is R1, the focal length of the optical lens system for taking image is f, and they satisfy the relation: $R1/f=0.39$.

In the second embodiment of the present optical lens system for taking image, the radius of curvature of the image-side surface of the second lens element is R4, the focal length of the optical lens system for taking image is f, and they satisfy the relation: $R4/f=0.96$.

In the second embodiment of the present optical lens system for taking image, the center thickness of the second lens element is CT2, and it satisfies the relation: $CT2=0.424$ mm.

In the second embodiment of the present optical lens system for taking image, the tangential angle of the image-side surface of the fourth lens element at the position of its effective optical diameter is ANG42, and $ANG42=-37.8$ deg. The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and these two planes Plane Tan and Plane Norm, respectively. This tangential angle is less than 90 degree in absolute value. The sign of the tangential angle is taken to be negative if N is closer than T to the object side of the optical lens system, and positive otherwise.

In the second embodiment of the present optical lens system for taking image, the incident angle of the chief rays corresponding to the maximum image height onto the electronic sensor is CRA (Chief Ray Angle), and half of the maximal field of view is HFOV, and they satisfy the relation: tan (CRA)/tan (HFOV)=0.80.

In the second embodiment of the present optical lens system for taking image, an on-axis distance between the first lens element and the second lens element is T12, the focal length of the optical lens system for taking image is f, and they satisfy the relation: $T12/f=0.020$.

In the second embodiment of the present optical lens system for talking image, the total track length of the optical lens system is TTL, the maximum image height of the optical lens system is ImgH, and they satisfy the relation:

$TTL/ImgH=1.86$.

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f (focal length) = 3.48 mm, Fno = 3.2, HFOV (half of field of view) = 32.1 deg.

| Surface # | | Curvature Radius | Thickness | Material | Index | Abbe # | Focal length |
|---|---|---|---|---|---|---|---|
| 0 | Object Ape. Stop | Plano | Infinity | | | | |
| 1 | Lens 1 | 1.35154(ASP) | 0.577 | Plastic | 1.543 | 56.5 | 1.93 |
| 2 | | −4.00530(ASP) | 0.070 | | | | |
| 3 | Lens 2 | −4.25630(ASP) | 0.424 | Plastic | 1.583 | 30.2 | −3.13 |
| 4 | | 3.31540(ASP) | 0.520 | | | | |
| 5 | Lens 3 | −2.57121(ASP) | 0.490 | Plastic | 1.543 | 56.5 | −34.76 |
| 6 | | −3.17610(ASP) | 0.050 | | | | |
| 7 | Lens 4 | 2.14689(ASP) | 0.970 | Plastic | 1.530 | 55.8 | −34.59 |
| 8 | | 1.62106(ASP) | 0.300 | | | | |
| 9 | IR-filter | Plano | 0.300 | Glass | 1.517 | 64.1 | |
| 10 | | Plano | 0.390 | | | | — |
| 11 | Image | Plano | | | | | |

TABLE 4

Aspheric Coefficients

| | Surface # | | | |
|---|---|---|---|---|
| | 1 | 2 | 3 | 4 |
| k = | −3.80232E−01 | 0.00000E+00 | 0.00000E+00 | −9.95600E+00 |
| A4 = | −1.13523E−02 | −2.63415E−01 | −2.28186E−01 | 1.12339E−01 |
| A6 = | −1.07252E−01 | −3.23118E−01 | −2.71303E−01 | −1.60965E−01 |
| A8 = | 1.74057E−02 | −4.47433E−01 | −3.48195E−01 | 3.92431E−01 |
| A10 = | −7.96267E−01 | 1.47164E+00 | 2.39319E+00 | |

| | Surface # | | | |
|---|---|---|---|---|
| | 5 | 6 | 7 | 8 |
| k = | −2.83012E+01 | −1.18242E+00 | −1.93924E+01 | −5.15358E+00 |
| A4 = | 1.65439E−02 | −1.73348E−01 | −2.81918E−01 | −1.06309E−01 |
| A6 = | −3.20743E−01 | 1.31254E−01 | 1.28797E−01 | 3.15016E−02 |
| A8 = | 4.72536E−02 | −6.18286E−02 | −1.44657E−02 | −5.98672E−03 |
| A10 = | 6.50861E−01 | −8.80875E−03 | 6.06841E−03 | −5.42676E−04 |
| A12 = | −1.38987E+00 | 3.03470E−02 | −1.35502E−03 | −3.50963E−05 |
| A14 = | 8.01233E−01 | 1.71781E−02 | −9.89564E−04 | 1.97629E−04 |
| A16 = | −4.80765E−02 | −2.17215E−02 | −4.62849E−04 | −3.61111E−05 |

Figure 5:
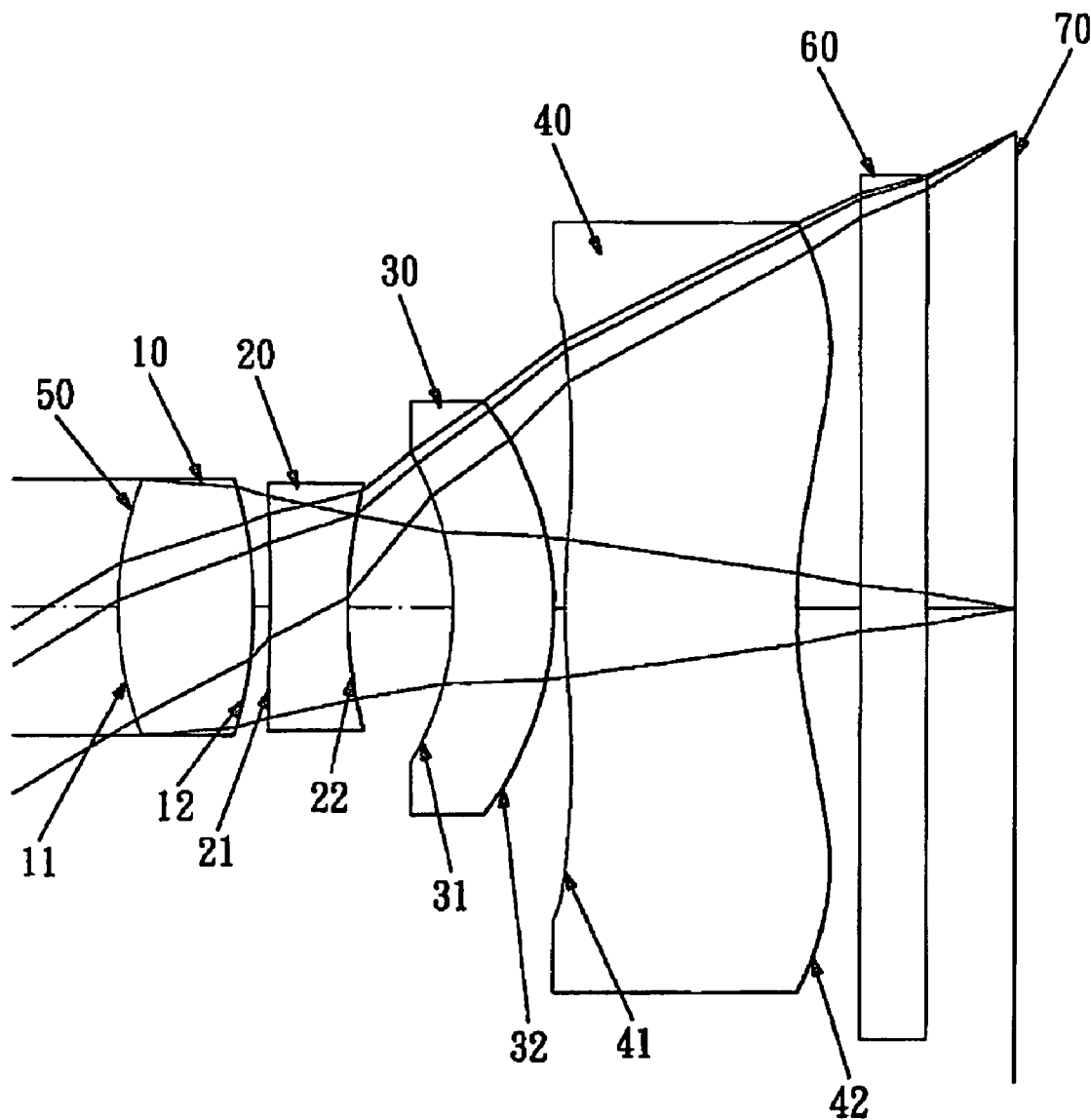
FIG. 5 shows an optical lens system for taking image in accordance with a third embodiment of the present invention.
Figure 6:
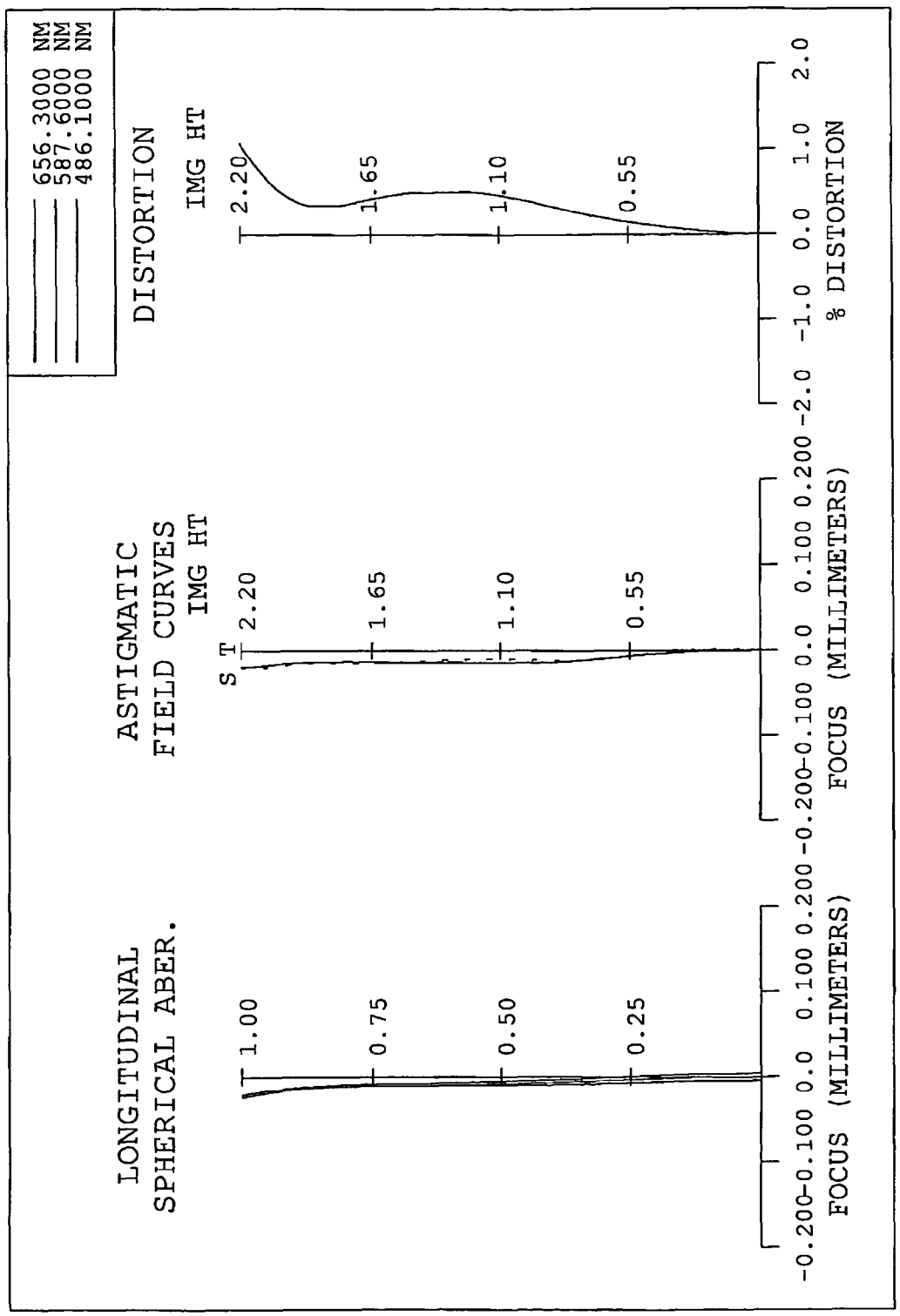
FIG. 6 shows the aberration curve of the third embodiment of the present invention.

Referring to FIG. 5, which shows an optical lens system for taking image in accordance with a third embodiment of the present invention, and FIG. 6 shows the aberration curve of the third embodiment of the present invention. An optical lens system for taking image in accordance with a third embodiment of the present invention comprises: from the object side to the image side:

A glass first lens element 10 with positive refractive power has a convex object-side surface 11 and a convex image-side surface 12, and both the object-side surface 11 and the image-side surface 12 of the first lens element 10 are aspheric.

A plastic second lens element 20 with negative refractive power has a concave object-side surface 21 and a concave image-side surface 22, both the object-side surface 21 and the image-side surface 22 of the second lens element 20 are aspheric.

A glass meniscus third lens element 30 with negative refractive power has a concave object-side surface 31 and a convex image-side surface 32, both the object-side surface 31 and the image-side surface 32 of the third lens element 30 are aspheric.

A plastic fourth lens element 40 with negative refractive power has a convex object-side surface 41 and a concave image-side surface 42, both the object-side surface 41 and the image-side surface 42 of the fourth lens element 40 are aspheric, and inflection points are formed on each of the object-side surface 41 and the image-side surface 42.

An aperture stop 50 is located in front of the first lens element 10.

An IR cut filter 60 is located behind the fourth lens element 40 and has no influence on the focal length of the optical lens system.

An image plane 70 is located behind the IR cut filter 60.

The equation for the aspheric surface profiles of the third embodiment has the same form as that of the first embodiment.

In the third embodiment of the present optical lens system for taking image, the focal length of the first lens element is f1, the focal length of the second lens element is f2, the focal length of the third lens element is f3, the focal length of the fourth lens element is f4, the focal length of the first and second lens elements combined is f12, the focal length of the optical lens system for taking image is f, and they satisfy the relations:

f=3.37 mm;

f/f1=1.70;

f/f2=−0.93;

f/f3=−0.10;

f/f4=−0.10;

f/f12=1.03.

In the third embodiment of the present optical lens system for taking image, the Abbe number of the first lens element is V1, the Abbe number of the second lens element is V2, the Abbe number of the fourth lens element is V4, and they satisfy the relations:

V2=30.2;

V4=55.8;

[(V1+V4)/2]−V2=33.2.

In the third embodiment of the present optical lens system for taking image, the radius of curvature of the object-side surface of the first lens element is R1, the focal length of the optical lens system for taking image is f, and they satisfy the relation: R1/f=0.46.

In the third embodiment of the present optical lens system for taking image, the radius of curvature of the image-side surface of the second lens element is R4, the focal length of the optical lens system for taking image is f, and they satisfy the relation: R4/f=0.70.

In the third embodiment of the present optical lens system for taking image, the center thickness of the second lens element is CT2, and it satisfies the relation: CT2=0.350 mm.

In the third embodiment of the present optical lens system for taking image, the tangential angle of the image-side surface of the fourth lens element at the position of its effective optical diameter is ANG42, and ANG42=−29.5 deg. The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and these two planes Plane Tan and Plane Norm, respectively. This tangential angle is less than 90 degree in absolute value. The sign of the tangential angle is taken to be negative if N is closer than T to the object side of the optical lens system, and positive otherwise.

In the third embodiment of the present optical lens system for taking image, the incident angle of the chief rays corresponding to the maximum image height onto the electronic sensor is CRA (Chief Ray Angle), and half of the maximal field of view is HFOV, and they satisfy the relation: tan (CRA)/tan (HFOV)=0.79.

In the third embodiment of the present optical lens system for taking image, an on-axis distance between the first lens element and the second lens element is T12, the focal length of the optical lens system for taking image is f, and they satisfy the relation: T12/f=0.022.

In the third embodiment of the present optical lens system for taking image, the total track length of the optical lens system is TTL, the maximum image height of the optical lens system is ImgH, and they satisfy the relation:

TTL/ImgH=1.86.

The detailed optical data of the third embodiment is shown in table 5, and the aspheric surface data is shown in table 6, wherein the units of the radius of curvature, the thickness and the focal length are expressed in mm, and HFOV is half of the maximal field of view.

It is to be noted that the tables 1-6 show different data from the different embodiments, however, the data of the different embodiments is obtained from experiments. Therefore, any product of the same structure is deemed to be within the scope of the present invention even if it uses different data. Table 7 is the data relevant to the respective embodiments of the present invention.

TABLE 5

(Embodiment 3)
f (focal length) = 3.37 mm, Fno = 2.8, HFOV (half of field of view) = 33.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.06 | | | | |
| 2 | Lens 1 | 1.54798(ASP) | 0.618 | Glass | 1.550 | 71.0 | 1.99 |
| 3 | | −3.19510(ASP) | 0.073 | | | | |
| 4 | Lens 2 | −24.58110(ASP) | 0.350 | Plastic | 1.583 | 30.2 | −3.66 |
| 5 | | 2.34904(ASP) | 0.497 | | | | |
| 6 | Lens 3 | −1.40908(ASP) | 0.445 | Glass | 1.623 | 58.1 | −33.65 |
| 7 | | −1.69373(ASP) | 0.050 | | | | |
| 8 | Lens 4 | 2.30741(ASP) | 1.050 | Plastic | 1.530 | 55.8 | −33.59 |
| 9 | | 1.72069(ASP) | 0.300 | | | | |
| 10 | IR-filter | Plano | 0.300 | Glass | 1.517 | 64.1 | |
| 11 | | Plano | 0.410 | | | | — |
| 12 | Image | Plano | | | | | |

TABLE 6

Aspheric Coefficients

| | Surface # | | | |
|---|---|---|---|---|
| | 2 | 3 | 4 | 5 |
| k = | −9.73069E−01 | 0.00000E+00 | 0.00000E+00 | −1.06503E+00 |
| A4 = | −3.94075E−02 | −2.23415E−01 | −9.85161E−02 | 1.26252E−01 |
| A6 = | −1.15948E−01 | −1.11778E−01 | −1.56380E−01 | 1.69069E−01 |
| A8 = | −1.66846E−01 | 4.54686E−01 | 1.19232E+00 | 4.77795E−01 |
| A10 = | −9.39930E−02 | −4.49351E−01 | −8.27766E−01 | |

| | Surface # | | | |
|---|---|---|---|---|
| | 6 | 7 | 8 | 9 |
| k = | −1.00545E+01 | −3.30666E+00 | −2.79846E+01 | −7.47737E+00 |
| A4 = | −1.35799E−01 | −1.55650E−01 | −1.94772E−01 | −7.23080E−02 |
| A6 = | −1.80601E−01 | 1.31428E−01 | 1.23192E−01 | 1.63746E−02 |
| A8 = | 8.16421E−02 | −8.83077E−02 | −3.03850E−02 | −2.25762E−03 |
| A10 = | 3.19518E−01 | 3.29192E−03 | 1.42617E−03 | −2.02787E−04 |
| A12 = | −1.42044E+00 | 4.71554E−02 | 2.88469E−05 | −2.24645E−04 |
| A14 = | 1.61603E+00 | 2.00860E−02 | 6.96749E−04 | 1.49279E−04 |
| A16 = | −6.89759E−01 | −3.71448E−02 | −3.45406E−04 | −2.07466E−05 |

TABLE 7

| | Embodiment 1 | Embodiment 2 | Embodiment 3 |
|---|---|---|---|
| f | 3.56 | 3.48 | 3.37 |
| Fno | 2.80 | 3.20 | 2.80 |
| HFOV | 31.6 | 32.1 | 33.0 |
| V2 | 23.4 | 30.2 | 30.2 |
| V4 | 55.8 | 55.8 | 55.8 |
| (V1 + V4)/2 − V2 | 32.8 | 26.0 | 33.2 |
| f/f1 | 1.50 | 1.80 | 1.70 |
| f/f2 | −0.64 | −1.12 | −0.93 |
| f/f3 | −0.003 | −0.10 | −0.10 |
| f/f4 | −0.39 | −0.10 | −0.10 |
| f/f12 | 1.07 | 0.98 | 1.03 |
| R1/f | 0.32 | 0.39 | 0.46 |
| R4/f | 0.69 | 0.96 | 0.70 |
| CT2 | 0.350 | 0.424 | 0.350 |
| T12/f | 0.020 | 0.020 | 0.022 |
| ANG42 | −34.7 | −37.8 | −29.5 |
| Tan(CRA)/tan(HFOV) | 0.82 | 0.80 | 0.79 |
| TTL/ImgH | 1.75 | 1.86 | 1.86 |

While we have shown and described various embodiments in accordance with the present invention, it is clear to those skilled in the art that further embodiments may be made without departing from the scope of the present invention.

What is claimed is:

1. An optical lens system for taking image comprising four lens elements with refractive power, in order from the object side to the image side:
    a first lens element with positive refractive power having a convex object-side surface;
    a second lens element with negative refractive power having a concave image-side surface and at least one aspheric surface;
    a meniscus third lens element with negative refractive power having a convex image-side surface; and
    a fourth lens element with negative refractive power having a convex object-side surface and an aspheric image-side surface.

2. The optical lens system for taking image as claimed in claim 1, wherein an Abbe number of the second lens element is V2, and it satisfies the relation: V2<32.

3. The optical lens system for taking image as claimed in claim 2, wherein the second lens element is made of plastic, and both object-side and image-side surfaces of the second lens element are aspheric.

4. The optical lens system for taking image as claimed in claim 3, wherein both object-side and image-side surfaces of the first lens element are aspheric.

5. The optical lens system for taking image as claimed in claim 4, wherein the first lens element is made of plastic.

6. The optical lens system for taking image as claimed in claim 1, wherein the third lens element is made of plastic, both object-side and image-side surfaces of the third lens element are aspheric, the fourth lens element is made of plastic, both object-side and image-side surfaces of the fourth lens element are aspheric, inflection points are formed on the fourth lens element, an on-axis distance between the first lens element and the second lens element is T12, a focal length of the optical lens system for taking image is f, and they satisfy the relation: T12/f>0.015.

7. The optical lens system for taking image as claimed in claim 4, wherein an Abbe number of the first lens element is V1, an Abbe number of the second lens element is V2, an Abbe number of the fourth lens element is V4, and they satisfy the relation: [(V1+V4)/2]−V2>15, and V4>45.

8. The optical lens system for taking image as claimed in claim 1 further comprising an electronic imaging sensor for enabling an object to be photographed to be imaged on it, a total track length of the optical lens system is TTL, a maximum image height of the optical lens system is ImgH, and they satisfy the relation:

TTL/ImgH<2.2.

9. The optical lens system for taking image as claimed in claim 6, wherein a tangential angle of the image-side surface of the fourth lens element at a position of its effective optical diameter is ANG42, and it satisfies the relation: ANG42<−28 deg.

10. The optical lens system for taking image as claimed in claim 1, wherein a focal length of the first lens element is f1, a focal length of the optical lens system for taking image is f, and they satisfy the relation: 1.2<f/f1<2.0.

11. The optical lens system for taking image as claimed in claim 10, wherein a focal length of the third lens element is f3, the focal length of the optical lens system for taking image is f, and they satisfy the relation: −0.5<f/f3<0, a focal length of the fourth lens element is f4, the focal length of the optical lens system for taking image is f, and they satisfy the relation: −0.5<f/f4<0.

12. The optical lens system for taking image as claimed in claim 11, wherein the focal length of the first lens element is f1, the focal length of the second lens element is f2, the focal length of the third lens element is f3, the focal length of the fourth lens element is f4, the focal length of the optical lens system for taking image is f, and they satisfy the relations: 1.4<f/f1<1.7, −0.8<f/f2<−0.5, −0.2<f/f3<0, −0.5<f/f4<0.

13. The optical lens system for taking image as claimed in claim 11, wherein a radius of curvature of the object-side surface of the first lens element is R1, the focal length of the optical lens system for taking image is f, and they satisfy the relation: 0.2<R1/f<0.6, a radius of curvature of the image-side surface of the second lens element is R4, the focal length of the optical lens system for taking image is f, and they satisfy the relation: 0.5<R4/f<1.2.

14. The optical lens system for taking image as claimed in claim 1, wherein a focal length of the first and second lens elements combined is f12, the focal length of the optical lens system for taking image is f, and they satisfy the relation: 0.8<f/f12<1.2.

15. The optical lens system for taking image as claimed in claim 14, wherein a center thickness of the second lens element is CT2, and it satisfies the relation: 0.25 mm<CT2<0.7 mm.

16. The optical lens system for taking image as claimed in claim 15, wherein an Abbe number of the second lens element is V2, and it satisfies the relation: V2<29.

17. The optical lens system for taking image as claimed in claim 1 further comprising an aperture stop located in front of the second lens element.

18. An optical lens system for taking image comprising four lens elements with refractive power, in order from the object side to the image side:
a first lens element with positive refractive power;
a second lens element with negative refractive power;
a third lens element with negative refractive power; and
a fourth lens element with negative refractive power having at least one aspheric surface;
wherein at least two of the first, second, third and fourth lens elements are made of glass, and at least one of the first, second and third lens elements are formed with at least one aspheric surface, an on-axis distance between the first lens element and the second lens element is T12, a focal length of the optical lens system for taking image is f, and they satisfy the relation: T12/f>0.015.

19. The optical lens system for taking image as claimed in claim 18 further comprising an electronic imaging sensor for enabling a to-be-photographed object to be imaged on it, a total track length of the optical lens system is TTL, a maximum image height of the optical lens system is ImgH, and they satisfy the relation:

$TTL/ImgH<2.2.$

20. The optical lens system for taking image as claimed in claim 17, wherein an incident angle of chief rays corresponding to a maximum image height onto the electronic sensor is CRA (Chief Ray Angle), and half of the maximal field of view is HFOV, and they satisfy the relation: 0.5<tan(CRA)/tan(HFOV)<1.05.

21. The optical lens system for taking image as claimed in claim 1 further comprising an aperture stop located in front of the first lens element, wherein the first lens element has a concave image-side surface, and the second lens element has a convex object-side surface.

22. An optical lens system for taking image comprising four lens elements with refractive power, in order from the object side to the image side:
an aperture stop;
a first lens element with positive refractive power having a convex object-side surface and a convex image-side surface;
a second lens element with negative refractive power having a concave object-side surface and a concave image-side surface, and both the object-side and image-side surfaces of the second lens element being aspheric;
a meniscus third lens element with negative refractive power having a convex image-side surface, both object-side and image-side surfaces of the third lens element being aspheric; and
a fourth lens element with negative refractive power having a convex object-side surface and a concave image-side surface, both object-side and image-side surfaces of the fourth lens element being aspheric, inflection points are formed on the fourth lens element, wherein an on-axis distance between the first lens element and the second lens element is T12, a focal length of the optical lens system for taking image is f, and they satisfy the relation: T12/f>0.015.

* * * * *